(12) United States Patent
Saito

(10) Patent No.: US 6,554,741 B2
(45) Date of Patent: Apr. 29, 2003

(54) SHIFT CONTROL DEVICE FOR AUTOMATIC TRANSMISSION

(75) Inventor: Yuji Saito, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/953,895

(22) Filed: Sep. 18, 2001

(65) Prior Publication Data

US 2002/0035013 A1 Mar. 21, 2002

(30) Foreign Application Priority Data

Sep. 18, 2000 (JP) ........................................ 2000-282323

(51) Int. Cl.$^7$ ............................ F16H 59/48; F16H 61/26
(52) U.S. Cl. ........................................ 477/120; 477/140
(58) Field of Search ............................ 475/125, 128; 477/120, 131, 140, 141

(56) References Cited

U.S. PATENT DOCUMENTS

| | | | | |
|---|---|---|---|---|
| 5,053,963 A | * | 10/1991 | Mack | 74/866 |
| 5,201,251 A | * | 4/1993 | Kitagawa et al. | 477/120 X |
| 5,445,577 A | * | 8/1995 | Fujita et al. | 477/120 |
| 5,746,680 A | * | 5/1998 | Kato et al. | 477/95 |
| 5,765,117 A | * | 6/1998 | Horiguchi | 477/120 X |
| 5,772,555 A | * | 6/1998 | Minowa et al. | 477/120 X |
| 6,024,672 A | * | 2/2000 | Chung | 477/140 |
| 6,067,495 A | * | 5/2000 | Fliearman et al. | 477/120 X |
| 6,149,546 A | * | 11/2000 | Tabata et al. | 477/125 |
| 6,174,262 B1 | * | 1/2001 | Ohta et al. | 477/120 X |
| 6,328,673 B1 | * | 12/2001 | Monowa et al. | 477/120 X |

FOREIGN PATENT DOCUMENTS

| | | |
|---|---|---|
| JP | 6-129528 | 5/1994 |
| JP | 10-47468 | 2/1998 |

OTHER PUBLICATIONS

U.S. patent application Ser. No. 09/936,811, Murasugi et al., filed Sep. 18, 2001.
U.S. patent application Ser. No. 09/953,893, Tanaka et al., filed Sep. 18, 2001.
U.S. patent application Ser. No. 09/953,936, Kato, filed Sep. 18, 2001.
U.S. patent application Ser. No. 09/953,937, Saito, filed Sep. 18, 2001.
U.S. patent application Ser. No. 09/953,966, Saito, filed Sep. 18, 2001.
U.S. patent application Ser. No. 09/953,967, Saito, filed Sep. 18, 2001.
U.S. patent application Ser. No. 09/953,968, Saito, filed Sep. 18, 2001.
U.S. patent application Ser. No. 09/953,969, Saito, filed Sep. 18, 2001.
U.S. patent application Ser. No. 09/953,972, Saito, filed Sep. 18, 2001.
U.S. patent application Ser. No. 09/954,017, Murasugi et al., filed Sep. 18, 2001.
U.S. patent application Ser. No. 09/954,019, Saito, filed Sep. 18, 2001.
U.S. patent application Ser. No. 09/954,298, Saito, filed Sep. 18, 2001.

* cited by examiner

*Primary Examiner*—Sherry Estremsky
*Assistant Examiner*—Roger Pang
(74) *Attorney, Agent, or Firm*—Foley & Lardner

(57) ABSTRACT

In a shift control device for an automatic transmission capable of switching from a normal automatic shift control to a drive-downshift forcible termination control when a time rate of change in transmission input speed is reduced to below a threshold value owing to a drop in transmission input torque during drive downshift from a higher gear position to a lower gear position with an accelerator pedal depressed, a drive-downshift forcible termination control section is provided. The drive-downshift forcible termination section executes the drive-downshift forcible termination control only when the time rate of change in transmission input speed is reduced to below a first predetermined threshold value and a value equivalent to the transmission input torque is reduced to below a second predetermined threshold value, to forcibly terminate the drive downshift.

17 Claims, 8 Drawing Sheets

FIG.2

|  | R/C | H/C | L/C | LR/B | L/OWC | 2-4/B |
|---|---|---|---|---|---|---|
| 1st |  |  | ◯ | (◯) | ◯ |  |
| 2nd |  |  | ◯ |  |  | ◯ |
| 3rd |  | ◯ | ◯ |  |  |  |
| 4th |  | ◯ |  |  |  | ◯ |
| Rev | ◯ |  |  | ◯ |  |  |

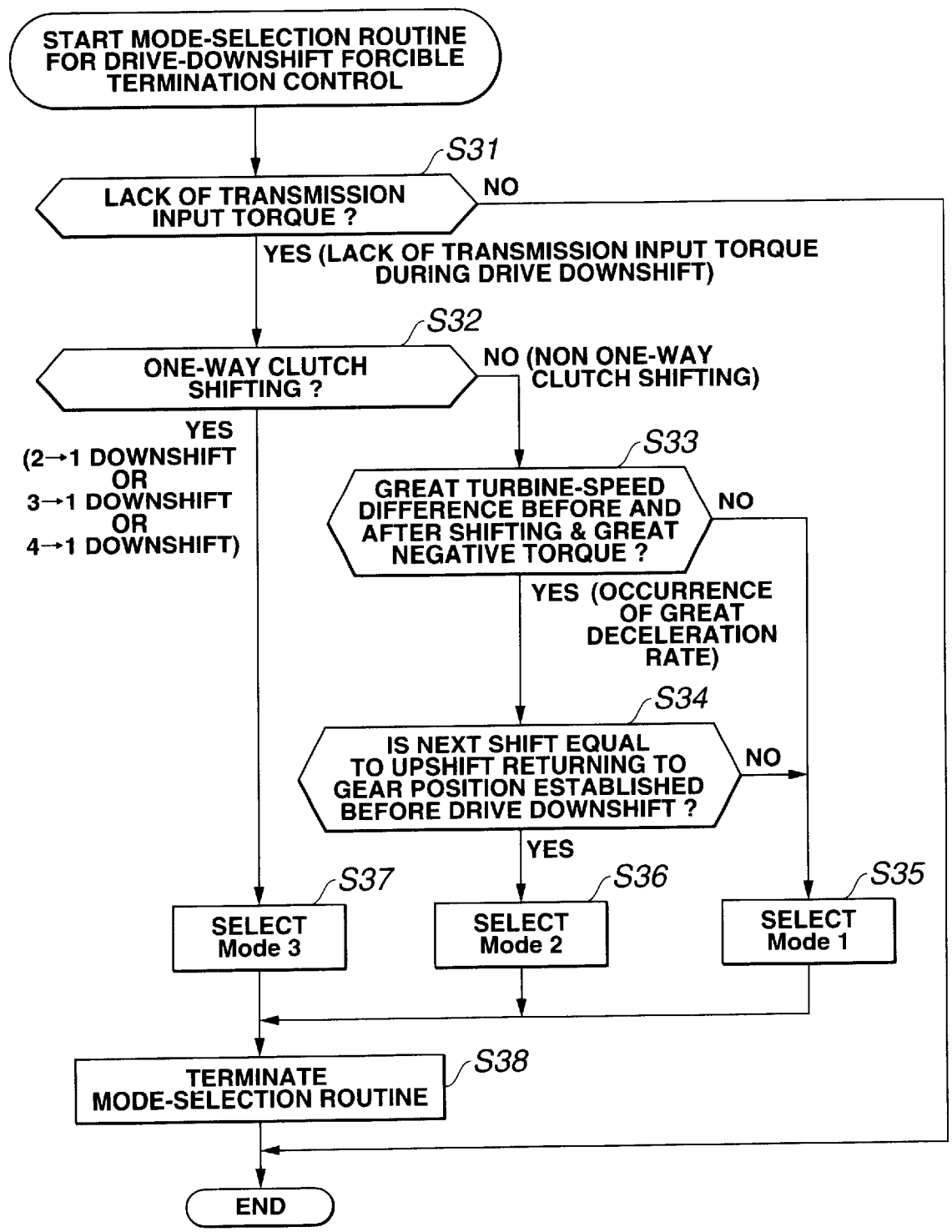

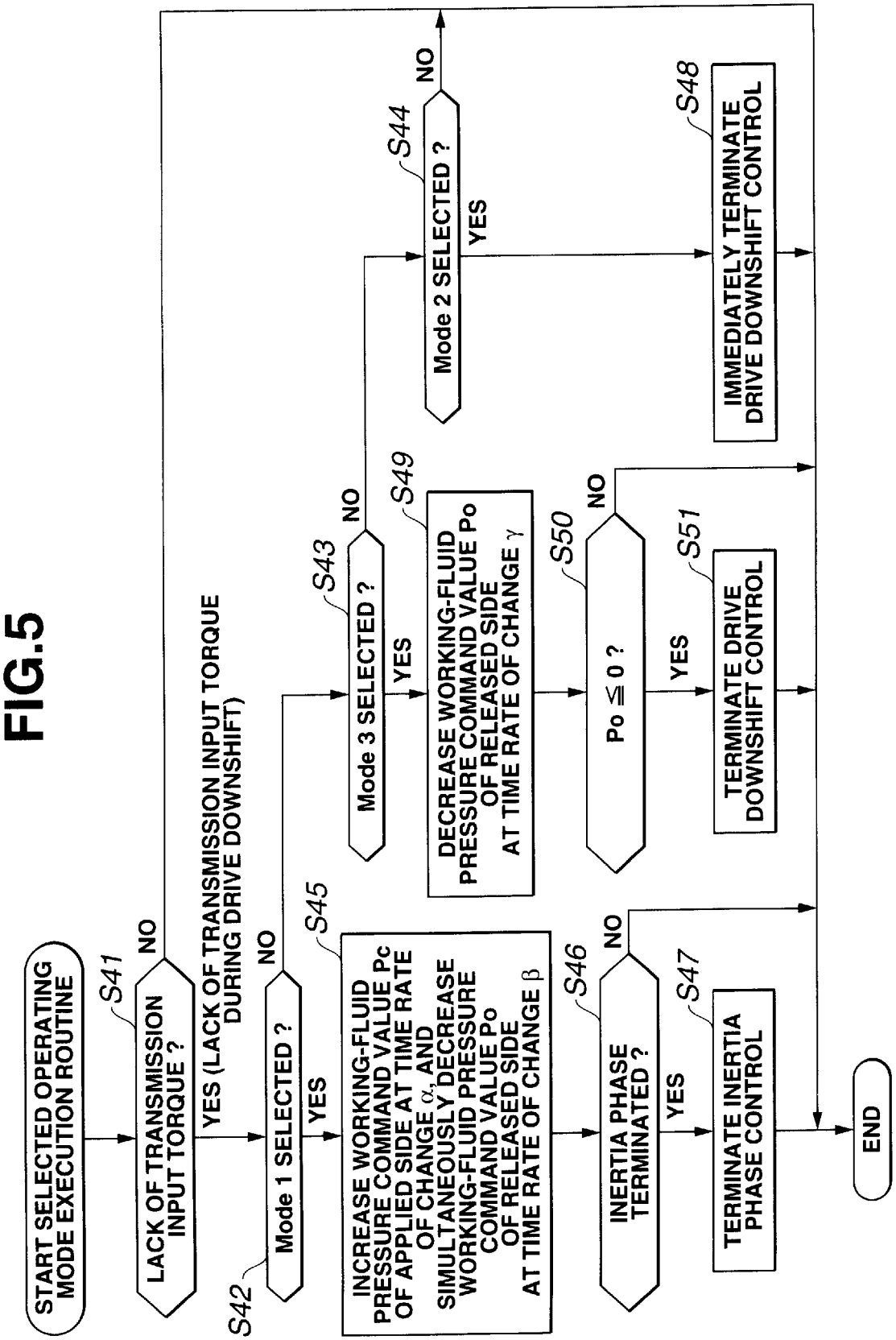

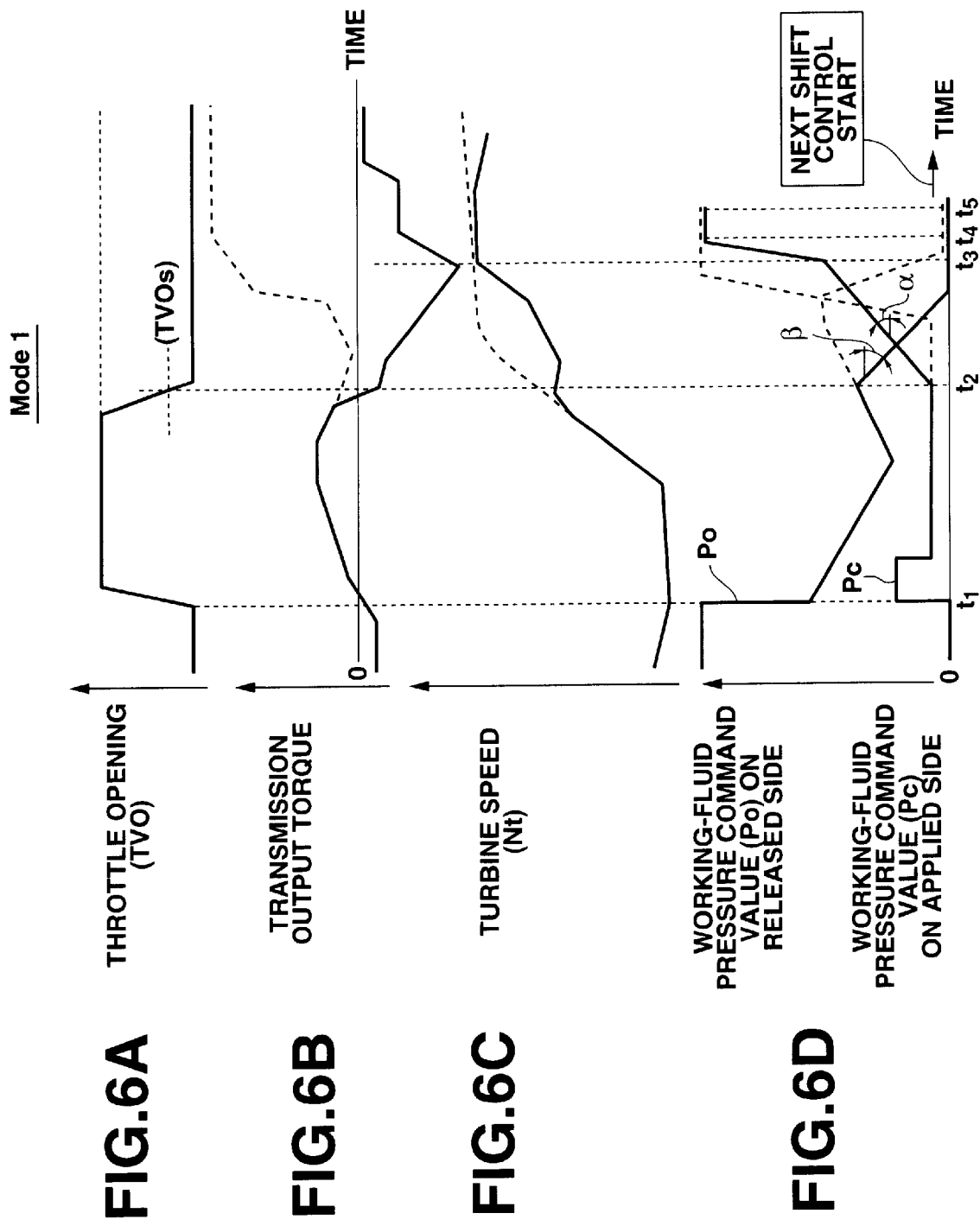

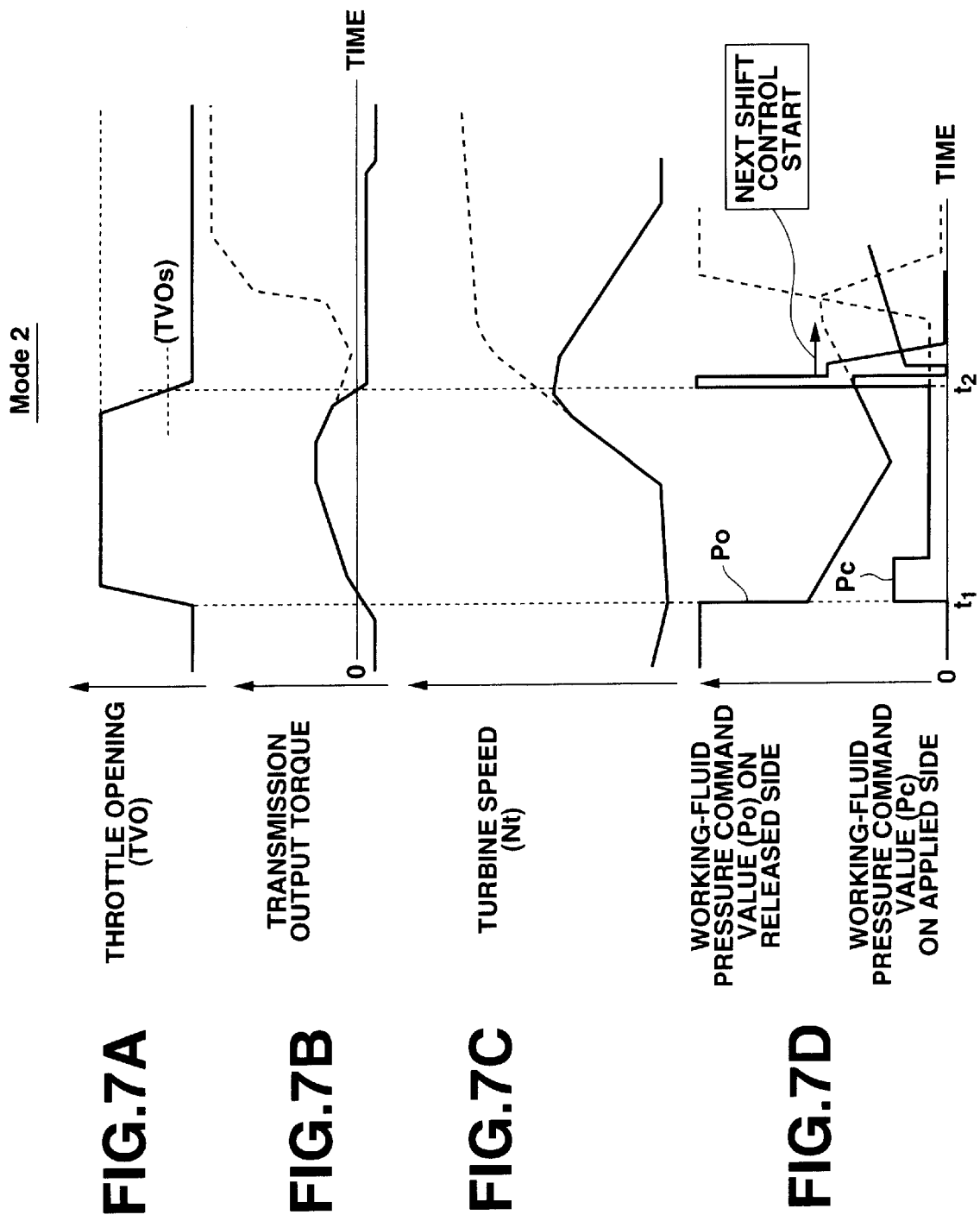

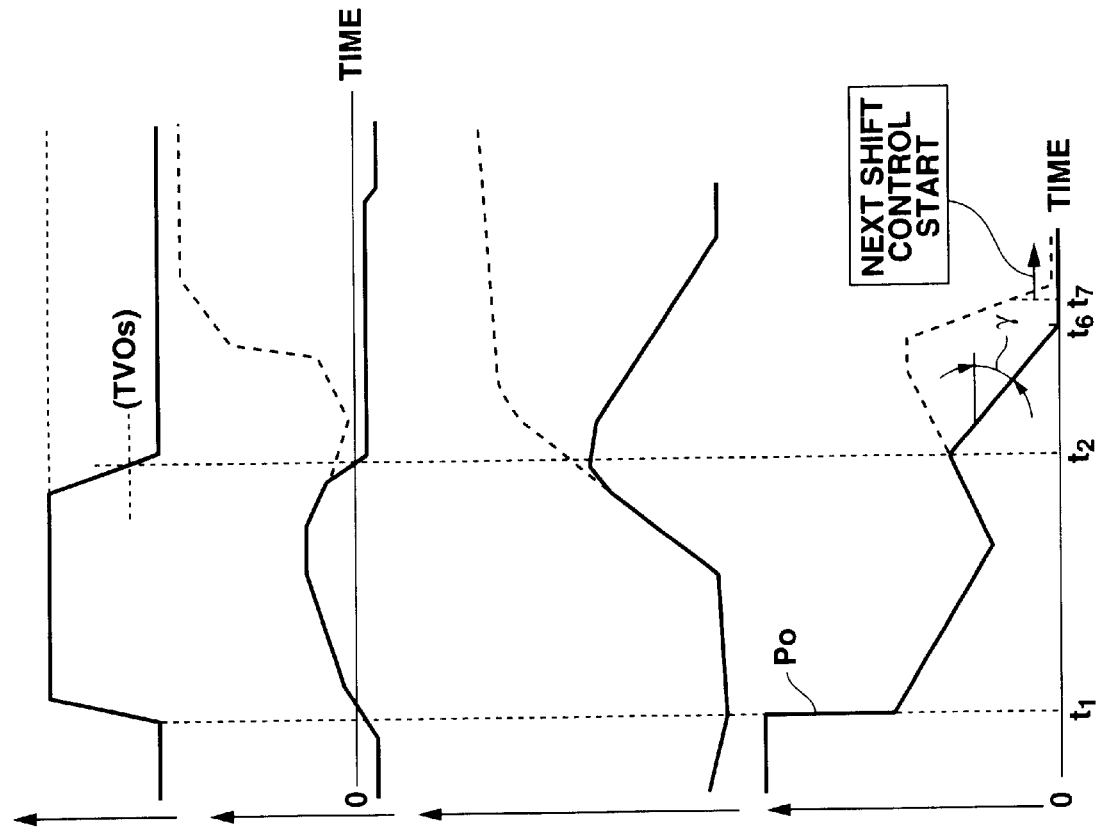
FIG.8A THROTTLE OPENING (TVO)
FIG.8B TRANSMISSION OUTPUT TORQUE
FIG.8C TURBINE SPEED (Nt)
FIG.8D WORKING-FLUID PRESSURE COMMAND VALUE (Po) ON RELEASED SIDE

SHIFT CONTROL DEVICE FOR AUTOMATIC TRANSMISSION

TECHNICAL FIELD

The present invention relates to a shift control device for an automatic transmission, and particularly to a technique for transient downshift control executed when a value of transmission input torque becomes reduced to below a torque value needed to advance a shift during downshifting with an accelerator pedal depressed (with a throttle whose opening increases) or in a power-on condition of the vehicle.

BACKGROUND ART

As is well known, automatic transmissions in automotive vehicles operate to determine a desired power flow or a power-transmission path in a power train, that is, a desired transmission range gear mode (a desired gear position) by selectively hydraulically operating friction elements such as a plurality of clutches and brake bands, and to perform shifting from a range gear mode to another range gear mode by properly switching engagement/disengagement of each of the friction elements. In determining the desired range gear mode matching to engine/vehicle operating conditions, the automatic transmission uses a throttle opening (regarded as engine load) and a vehicle speed. A shift pattern is preprogrammed, so that a lower gear is selected as the throttle opening (engine load) increases. Therefore, when the driver depresses or pushes the accelerator pedal (or throttle pedal), downshifting to a lower gear occurs. Such downshifting with the accelerator pedal depressed will be hereinafter referred to as a "drive downshift" or a "power-on downshift". Conversely, when releasing the accelerator pedal from the depressed state, upshifting to a higher gear occurs. Such upshifting with the accelerator pedal released will be hereinafter referred to as a "coast upshift". Usually, the previously-noted drive downshift is achieved as follows.

At the former stage of the drive downshift, the transmission input speed begins to rise by virtue of the transmission input torque owing to a drop in working-fluid pressure applied to each of friction elements to be disengaged or released (that is, owing to a drop in working-fluid pressure on the released side), and thus each of the friction elements to be disengaged or released begins to slip, with the result that an inertia phase starts. At the latter stage of the drive downshift, an electronic transmission controller determines that the inertia phase has been terminated as soon as the transmission input speed reaches an after-drive-downshift-termination synchronous speed, and then the controller completes the shifting operation by a rise in working-fluid pressure on the applied side). In this manner, a drive downshift is smoothly achieved with less shift shocks. However, if the current engine/vehicle operating conditions (including the current throttle opening) change, for example, in the event that the accelerator pedal is released from the depressed state, engine power output tends to drop. Thus, the transmission input speed itself cannot rise. Under such a condition, there is a tendency for the transmission input speed to decrease. When an effective gear ratio i (=$N_t/N_o$) of the transmission input speed (or turbine speed) $N_t$ to transmission output speed $N_o$ reaches an after-drive-downshift-termination gear ratio, the controller usually determines that the transmission input speed rises up to the previously-noted synchronous speed and thus the inertia phase has been terminated. For the reasons set forth above, in the presence of the release of the accelerator pedal after depression, there is a possibility that the effective gear ratio cannot rise intendedly, due to the undesirable decrease in transmission input speed $N_t$. In this case, the inertia phase cannot terminate for a long period of time. In other words, the system has difficulty in accurately determining a timing of termination of the inertia phase. This prevents a smooth shifting operation, that is, a smooth drive downshift and a properly timed inertia-phase termination. To avoid this, Japanese Patent Provisional Publication No. 6-129528 (hereinafter is referred to as "JP6-129528") teaches the rise in working-fluid pressure on the applied side at a first predetermined time rate of increase and the drop in working-fluid pressure on the released side at a second predetermined rate of decrease, regardless of the decision result based on the effective gear ratio ($N_t/N_o$), for forcibly advancing drive downshift in the presence of the return of the accelerator pedal from the depressed state to undepressed state during the drive downshift. This control will be hereinafter referred to as a "drive-downshift forcible termination control". In the system disclosed in JP6-129528, an electronic transmission controller determines that the accelerator pedal is returning from the depressed state to undepressed state, when the transmission input speed tends to reduce during the drive downshift. However, there are some drawbacks, if the controller uniformly determines the presence or absence of the return of the accelerator pedal from the depressed state to undepressed state by way of detection of a drop in the transmission input speed $N_t$ during the drive downshift.

SUMMARY OF THE INVENTION

Assuming that a command value of the working-fluid pressure on the released side is reduced according to a preprogrammed time rate of decrease when downshifting occurs due to a stepwise increased throttle opening, there is a possibility of great shift shocks. To avoid this, Japanese Patent Provisional Publication No. 10-47468 (hereinafter is referred to as "JP10-47468") has disclosed a downshift control device that ensures a smooth and moderate rise in the turbine speed $N_t$ by way of a temporary rise in the command value of the working-fluid pressure on the released side during the inertia phase. However, in the presence of negative transmission input torque fluctuations, in the presence of positive fluctuations in a friction coefficient of the friction element to be released, or in the presence of positive fluctuations in working-fluid pressure applied to the friction element to be released, there is an increased tendency the transmission input speed (turbine speed) $N_t$ to reduce during the inertia phase. Under such a condition, suppose the previously-described way (of JP6-129528) to determine the return of the accelerator pedal from the depressed state to undepressed state during the drive downshift is used. In such a case, although the transmission input torque value exceeds a set value but a rate of change in the transmission input speed is below a set value, the controller erroneously determines that a decrease in the rate of change in transmission input speed arises from a drop in the transmission input torque. Thus, the process of shifting down is wastefully advanced forcibly. This may result in shift shocks rather than smooth downshifting. As discussed above, as a first problem, in the system disclosed in JP6-129528, it is difficult to accurately detect or determine a transmission-input-speed drop arising from the return of the accelerator pedal from the depressed state to undepressed state during the drive downshift. As a second problem, when moderately releasing the accelerator pedal such that the transmission input speed (turbine speed $N_t$) continues to rise slightly, in the system of JP6-129528 it is difficult to detect the return of the accelerator pedal from the depressed state to undepressed state during the drive downshift. In this case, it is impossible to timely initiate the drive-downshift forcible termination control disclosed in JP6-129528. Additionally, when a value of torque created by the turbine runner itself tends to reduce owing to a rise in the turbine speed without returning the accelerator pedal to its undepressed state, the turbine speed has already been risen, but a time rate of increase in the turbine speed is excessively low. In such a case, it is impossible to timely initiate the drive-downshift forcible termination control disclosed in JP6-129528. As a third problem, under a particular condition that there is a great difference between transmission input speeds before and after shifting and additionally a value of transmission input torque is negative, the rotational speed of the engine that causes the negative transmission input torque is risen forcibly, during the drive-downshift forcible termination control according to which the working-fluid pressure on the applied side is risen at the first predetermined time rate of increase and the working-fluid pressure on the released side is dropped at the second predetermined rate of decrease. Thus, a great negative torque acts on the transmission output shaft. This results in pull-in torque shocks, in other words, an undesiredly great vehicle's deceleration rate (that is, uncomfortable shift feeling). As a fourth problem, the drive-downshift forcible termination control disclosed in JP6-129528 is based on the assumption that during the drive downshift friction elements to be engaged or applied exist. In case of an one-way clutch shifting process in which a friction element to be applied does not exist, the drive-downshift is caused only by releasing the friction element being in its engaged state and thus engaging the one-way clutch. Therefore, the drive-downshift forcible termination control disclosed in JP6-129528 cannot be applied to the drive-downshift based on the one-way clutch shifting process.

Accordingly, it is an object of the invention to provide a shift control device for an automatic transmission, which avoids the aforementioned disadvantages.

It is another object of the invention to provide a shift control device for an automatic transmission, which is capable of distinguishing a transmission-input-speed drop arising from the return of an accelerator pedal from its depressed state to undepressed state during drive downshift from a transmission-input-speed drop arising from the other factors to accurately detect or determine the transmission-input-speed drop based on the return of the accelerator pedal to the undepressed state during drive downshift.

It is a further object of the invention to provide a shift control device for an automatic transmission, which is capable of detecting the presence or absence of moderate releasing action of the accelerator pedal such that the transmission input speed continues to rise slightly, or detecting a reduction in torque created by the turbine runner (an excessively low time rate of increase in the turbine speed), arising from a rise in the turbine speed with no return of the accelerator pedal to its undepressed state so as to timely initiate the drive-downshift forcible termination control.

It is another object of the invention to provide a shift control device for an automatic transmission, in which the drive-downshift forcible termination control (executed due to a lack of transmission input torque) can be applied to a one-way clutch shifting process.

It is another object of the invention to provide a shift control device for an automatic transmission, which is capable of properly terminating the drive-downshift forcible termination control for a shortest possible period of time.

It is a still further object of the invention to provide a shift control device for an automatic transmission in which the drive-downshift forcible termination control is timed not to exert a bad influence upon a next shifting process.

It is another object of the invention to provide a shift control device for an automatic transmission in which, when the drive downshift is a non one-way clutch shifting process, the drive-downshift forcible termination control is executed so that the working-fluid pressure on the applied side is risen at a first predetermined time rate of increase while the working-fluid pressure on the released side is fallen at a second predetermined rate of decrease, and therefore an inertia phase can be terminated for a shortest possible period of time with less shift shocks.

It is another object of the invention to provide a shift control device for an automatic transmission which is capable of providing a desired shift feeling during the drive-downshift forcible termination control by optimally setting the previously-noted first and second predetermined time rates depending upon a quantity of state related to transmission input torque and a quantity of state related to the difference in transmission input speeds before and after shifting.

It is another object of the invention to provide a shift control device for an automatic transmission which is capable of preventing undesired pull-in shocks (that is, undesired vehicle's deceleration rate), even when the drive downshift is a non one-way clutch shifting process, the vehicle is conditioned in a particular state wherein there is a big difference in transmission input speeds before and after downshifting and a transmission input torque value is negative and thus the pull-in shocks may occur during the drive-downshift forcible termination control, and additionally a next shifting process corresponds to an upshift to a gear position that the transmission has been placed before the downshifting.

In order to accomplish the aforementioned and other objects of the present invention, a shift control device for an automatic transmission capable of automatically shifting to a desired gear position by selectively engaging a plurality of friction elements via working-fluid pressure, and of switching to a drive-downshift forcible termination control when a time rate of change in transmission input speed is reduced to below a threshold value owing to a drop in transmission input torque during drive downshift from a higher gear position to a lower gear position with an accelerator pedal depressed, the shift control device comprises a drive-downshift forcible termination control section that executes the drive-downshift forcible termination control only when the time rate of change in transmission input speed is reduced to below a first predetermined threshold value and a value equivalent to the transmission input torque is reduced to below a second predetermined threshold value, to forcibly terminate the drive downshift.

According to another aspect of the invention, a shift control device for an automatic transmission capable of automatically shifting to a desired gear position by selectively engaging a plurality of friction elements via working-fluid pressure, and of switching to a drive-downshift forcible termination control when a time rate of change in transmission input speed is reduced to below a threshold value owing to a drop in transmission input torque during drive downshift from a higher gear position to a lower gear position with an accelerator pedal depressed, said shift control device comprises a drive-downshift control determining section that determines whether the transmission is in a drive downshift control, an inertia phase control determining section that determines whether the transmission is in an inertia phase control according to which a transmission input speed is rising to an after-shifting synchronous speed, an arithmetic-calculation section that calculates a time rate of change in transmission input speed, a first comparison section that compares the time rate of change in transmission input speed to a first predetermined threshold value, an estimation section that estimates a value equivalent to the transmission input torque, a second comparison section that compares the value equivalent to the transmission input torque to a second predetermined threshold value, and a drive-downshift forcible termination control section that executes the drive-downshift forcible termination control only when the time rate of change in transmission input speed is reduced to below the first predetermined threshold value and the value equivalent to the transmission input torque is reduced to below the second predetermined threshold value, to forcibly terminate the drive downshift. The shift control device may further comprises a first determining section that determines whether the drive downshift is a one-way clutch shift caused by self-engagement of a one-way clutch while releasing a friction element being in its engaged state or a non one-way clutch shift, a second determining section that determines whether there is a possibility of a great vehicle deceleration rate occurring owing to a big difference in transmission input speeds before and after shifting and a great negative engine output torque, a third determining section that determines whether a next shifting process executed after termination of the drive downshift control is an upshift that returns to a gear position established before the drive downshift, and a mode-selection section that selects a first operating mode that forcibly terminates the inertia phase control with a first predetermined time delay when the drive downshift is the non one-way clutch shift without self-engagement of a one-way clutch and there is a less possibility of the great vehicle deceleration rate, and selects a second operating mode that immediately forcibly terminates the drive downshift control and immediately start the next shifting process when the drive downshift is the non one-way clutch shift and there is a possibility of the great vehicle deceleration rate and the next shifting process executed after termination of the drive downshift control is the upshift that returns to the gear position established before the drive downshift, and selects a third operating mode that forcibly terminates the drive downshift control with a second predetermined time delay when the drive downshift is the one-way clutch shift with self-engagement of the one-way clutch. At the first operating mode a working-fluid pressure of a first friction element to be applied is increased at a predetermined time rate of change and a working-fluid pressure of a second friction element to be released is decreased at a predetermined time rate of change, and at the second operating mode the working-fluid pressure of the first friction element is immediately increased up to a predetermined maximum pressure level and the working-fluid pressure of the second friction element is immediately decreased down to a predetermined minimum pressure level, and at the third operating mode only the working-fluid pressure of the second friction element is decreased at a predetermined time rate of change. Preferably, the first predetermined time delay is preferably determined based on the predetermined time rate of change for the first friction element to be applied and the predetermined time rate of change for the second friction element to be released, and the second predetermined time delay is determined based on the predetermined time rate of change for the second friction element to be released. More preferably, the predetermined time rate of change for the first friction element to be applied and the predetermined time rate of change for the second friction element to be released are determined depending upon both a quantity of state related to the transmission input torque and a quantity of state related to a difference in transmission input speeds before and after shifting, so as to provide a desired shift feeling. It is preferable that the predetermined time rate of change is preset to a maximum rate of change of a range within which there is no undershoot of the working-fluid pressure of the second friction element. More preferably, a determination of termination of the drive downshift control is made at a time when the working-fluid pressure of the second friction element is reduced to below a predetermined pressure level, and a next shifting process is inhibited for a period of time from this time.

The other objects and features of this invention will become understood from the following description with reference to the accompanying drawings.

BRIEF DESCRIPTION OF THE DRAWINGS

FIG. 2 is a chart of clutch engagements and band applications for all transmission operating conditions.

FIG. 4 is a flow chart showing a preprogrammed mode-selection routine used to select one of three operating modes (Mode 1, Mode 2, Mode 3) for the drive-downshift forcible termination control executed by the shift control device of the embodiment.

FIG. 5 is a flow chart showing a preprogrammed routine needed to concretely execute the operating mode selected through the routine of FIG. 4.

FIGS. 6A–6D are time charts showing the operation of the first operating mode (Mode 1) for the drive-downshift forcible termination control executed by the device of the embodiment.

FIGS. 7A–7D are time charts showing the operation of the second operating mode (Mode 2) for the drive-downshift forcible termination control executed by the device of the embodiment.

FIGS. 8A–8D are time charts showing the operation of the third operating mode (Mode 3) for the drive-downshift forcible termination control executed by the device of the embodiment.

DESCRIPTION OF THE PREFERRED EMBODIMENTS

Figure 1:
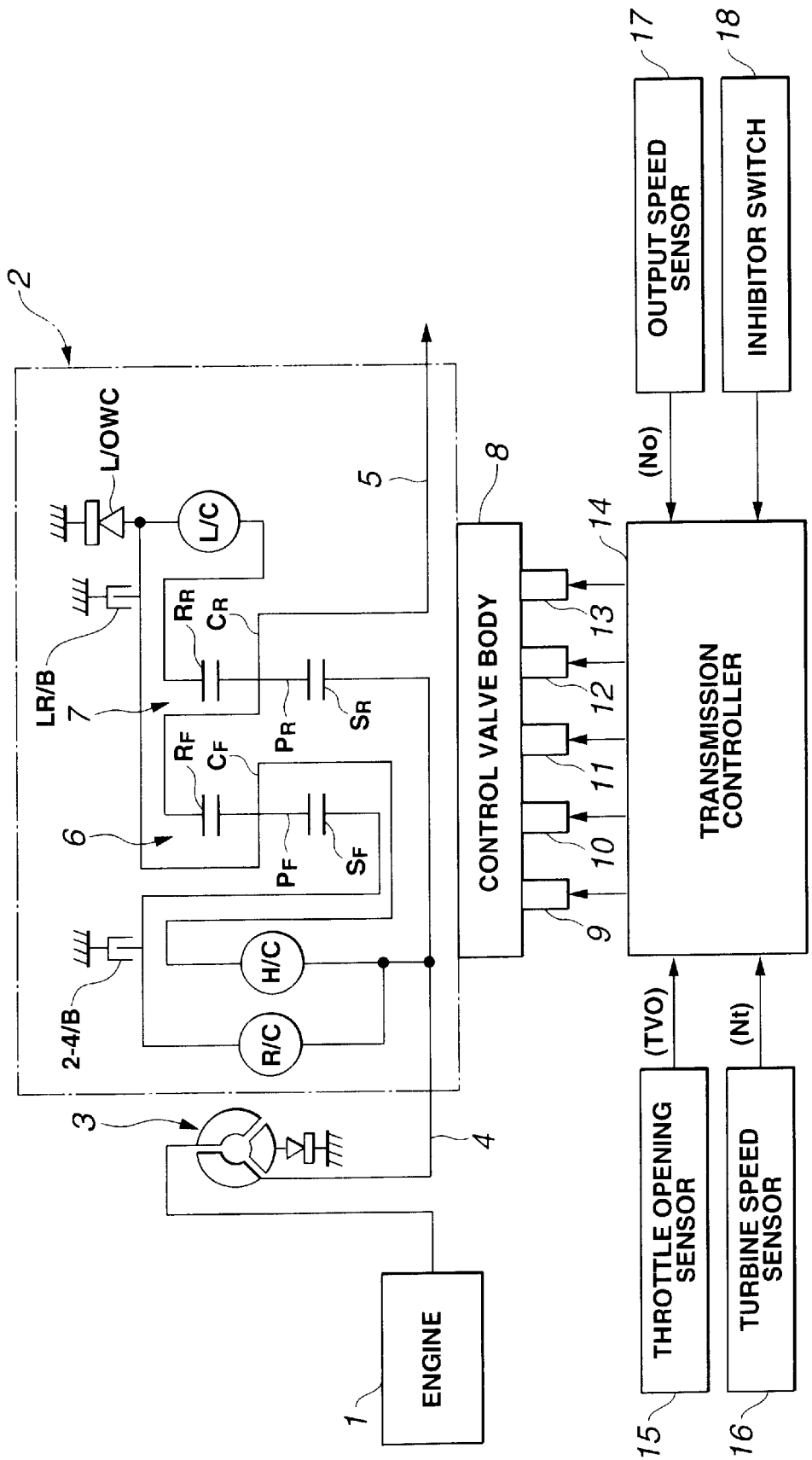
FIG. 1 is a system block diagram illustrating a power train and a control system of an automatic transmission employing a shift control device of one embodiment of the invention.

Referring now to the drawings, particularly to FIG. 1, the shift control device of the invention is exemplified in an automatic transmission 2 using a torque converter 3. Power output produced by an engine denoted by reference sign 1 is controlled by means of a throttle valve (not shown) whose opening (TVO) can be arbitrarily controlled between a predetermined maximum opening (i.e., a fully-opened throttle position, simply, a wide-open throttle) and a predetermined minimum opening (i.e., a fully-closed throttle position, simply, a closed throttle) depending on the amount of depression of a driver-operated accelerator pedal (not shown). Output rotation of engine 1 is transmitted via torque converter 3 to an input shaft 4 of automatic transmission 2. Automatic transmission 2 has a transmission input shaft 4, a transmission output shaft 5 coaxially arranged with transmission input shaft 4 such that one axial end of transmission input shaft 4 opposes one axial end of transmission output shaft 5, a front planetary gearset 6 and a rear planetary gearset 7. Front and rear planetary gearsets 6 and 7 are mounted on the transmission input and output shafts from the axial end of the transmission input shaft facing the engine crankshaft, in that order. The transmission input and output shafts and the front and rear planetary gearsets serves as a main component of a planetary-gear transmission system of automatic transmission 2. Front planetary gearset 6 located near engine 1 is a simple planetary gear set consisting of a front sun gear $S_F$, a front ring gear $R_F$, front planet pinions $P_F$ being in meshed-engagement with front sun gear $S_F$ and front ring gear $R_F$, and a front planet-pinion carrier $C_F$ in which front pinions $P_F$ are rotatably held. Also, rear planetary gearset 7 located apart from engine 1 is a simple planetary gear set consisting of a rear sun gear $S_R$, a rear ring gear $R_R$, rear planet pinions $P_R$ being in meshed-engagement with rear sun gear $S_R$ and rear ring gear $R_R$, and a rear planet-pinion carrier $C_R$ in which rear pinions $P_R$ are rotatably held. As a plurality of friction elements needed to determine a power-transmission path (a desired gear position), a low clutch L/C, a 2-4 brake band 2-4/B, a high clutch H/C, a low-and-reverse brake band LR/B, a low one-way clutch L/OWC, and a reverse clutch R/C are provided in proper correlation with both the first and second planetary gearsets 6 and 7. As clearly shown in FIG. 1, front sun gear $S_F$ can be properly connected to transmission input shaft 4 by means of reverse clutch R/C. Additionally, front sun gear $S_F$ is locked up by applying 2-4 brake band 2-4/B. In other words, the front sun gear is held stationary by way of application of the 2-4 brake band. Front pinion carrier $C_F$ can be properly connected to transmission input shaft 4 by means of high clutch H/C. Front pinion carrier $C_F$ is also prevented from rotating in a rotational direction opposite to a rotating direction of engine 1 by means of low one-way clutch L/OWC. Additionally, front pinion carrier $C_F$ is locked up and held stationary by way of application of low-and-reverse brake band LR/B. Front pinion carrier $C_F$ and rear ring gear $R_R$ can be properly connected to each other via low clutch L/C. Front ring gear $R_F$ and rear pinion carrier $C_R$ are connected to each other. These members $R_F$ and $C_R$ are also connected to transmission output shaft 5. On the other hand, rear sun gear $S_R$ is connected to transmission input shaft 4.

Figure 2:
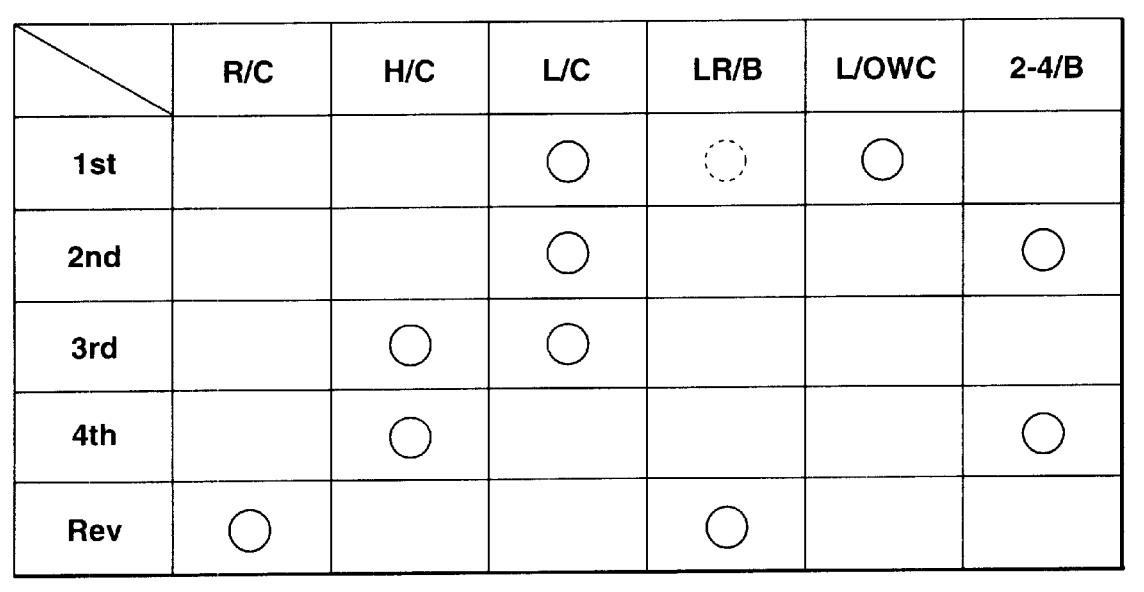

FIG. 2 shows clutch engaged and disengaged states and band applied and released states of the friction elements (L/C, 2-4/B, H/C, LR/B, L/OWC, and R/C) of the planetary-gear transmission system, for establishing the forward 4-speed (1st, 2nd, 3rd and 4th), and reverse 1-speed (Reverse) gear positions. Of these friction elements, low clutch L/C, 2-4 brake band 2-4/B, high clutch H/C, low-and-reverse brake band LR/B, and reverse clutch R/C are selectively engaged or disengaged hydraulically. On the other hand, low one-way clutch L/OWC is mechanically self-engaged or self-disengaged. In FIG. 2, clutch-engagement or band-application is marked with a circle indicated by a solid line, clutch-disengagement or band-release is indicated by a blank space, and application of low-and-reverse brake band LR/B (when engine braking is required) is marked with a circle indicated by a broken line. The 1st-speed gear position is established by hydraulically engaging low clutch L/C and by self-engagement of low one-way clutch L/OWC serving to receive a reaction force when the vehicle is accelerated. When the driver releases the accelerator pedal and coast during vehicle driving with the transmission held in the 1st gear position, low one-way clutch L/OWC runs freely, thus disabling an engine braking effect. Even when releasing the accelerator pedal with the transmission held in the low gear position, the engine does not exert a braking effect on the vehicle, thereby preventing the occurrence of uncomfortable deceleration feeling. If the engine braking effect is required during vehicle driving with the transmission held in the 1st gear position, as shown in FIG. 2, low-and-reverse brake LR/B is hydraulically applied to disable low one-way clutch L/OWC to run freely, thus resulting in an engine braking effect. In this case, rear sun gear $S_R$ is connected to transmission input shaft 4. Rear ring gear $R_R$ is fixed, while rear pinion carrier $C_R$ is connected to transmission output shaft 5. The 2nd-speed gear position is established by hydraulically engaging low clutch L/C and by hydraulically applying 2-4 brake band 2-4/B. In this case, rear sun gear $S_R$ is connected to transmission input shaft 4. First sun gear is locked up, while rear pinion carrier $C_R$ is connected to transmission output shaft 5. The 3rd-speed gear position is established by hydraulically engaging both high clutch H/C and low clutch L/C. In this case, rear ring gear $R_R$ and rear sun gear $S_R$ are both connected to transmission input shaft 4, while front ring gear $R_F$ is connected to transmission output shaft 5, so that the transmission gear ratio becomes equal to 1. The 4th-speed gear position is established by hydraulically engaging high clutch H/C and by hydraulically applying 2-4 brake band 2-4/B. In this case, front pinion carrier $C_F$ and rear sun gear $S_R$ are both connected to transmission input shaft 4, front sun gear $S_F$ is locked by the 2-4 brake band, while rear pinion carrier $C_R$ is connected to transmission output shaft 5, so as to establish the overdrive gear position. The reverse gear position is established by hydraulically engaging reverse clutch R/C and by hydraulically applying low-and-reverse brake band LR/B. In this case, front and rear sun gears $S_F$ and $S_R$ are both connected to transmission input shaft 4. Front pinion carrier $C_F$ is locked up by the low-and-reverse brake band, while rear pinion carrier $C_R$ is connected to transmission output shaft 5. The clutch- and band-application logic for the hydraulically-operated friction elements (R/C, H/C, L/C, LR/B, 2-4/B) shown in FIG. 2 is realized by means of a control valve body 8 shown in FIG. 1. Although it is not clearly shown in FIG. 1, various valves are installed or inserted into control valve body 8. For instance, in addition to a pressure regulator valve and a manual valve, an electromagnetic line pressure solenoid valve (simply, a line pressure solenoid) 9, an electromagnetic low clutch solenoid valve (simply, a low clutch solenoid) 10, an electromagnetic 2-4 brake band solenoid valve (simply, a 2-4 brake band solenoid) 11, an electromagnetic high clutch solenoid valve (simply, a high clutch solenoid) 12, and an electromagnetic low-and-reverse brake band solenoid valve (simply, a low-and-reverse brake band solenoid) 13 are mounted in the control valve body. Line pressure solenoid 9 acts to apply a solenoid pressure therefrom to the pressure regulator valve so as to adjust a line pressure at a high pressure level when line pressure solenoid 9 is energized. Conversely when line pressure solenoid 9 is de-energized, the line pressure is adjusted to a low pressure level. The line pressure which is switchable between high and low by way of the ON/OFF control for line pressure solenoid 9, is used as an initial pressure for automatic shift control. Depending upon driver's wishes (that is, the desired running condition), the manual valve is manually operated by the driver for selection of either the drive range (D), reverse range (R), or parking/stopping range (P,N).

In the D range, as a D-range pressure the manual valve supplies the line pressure into low clutch solenoid 10, 2-4 brake band solenoid 11, high clutch solenoid 12, and low-and-reverse solenoid 13. Solenoid valves 10, 11, 12 and 13 create respective solenoid pressures by properly adjusting or reducing the D-range pressure applied to each individual solenoid valve by way of duty-cycle control. The duty-cycle controlled low clutch pressure, duty-cycle controlled 2-4 brake band pressure, duty-cycle controlled high clutch pressure, and duty-cycle controlled low-and-reverse brake band pressure are directed to the respective friction elements (L/C, 2-4/B, H/C, LR/B), to individually control working-fluid pressure levels for these friction elements. In this manner, by duty-cycle controlling the solenoids 10 through 13, the clutch- and band-application logic ranging from the 1st-speed gear position to the 4th-speed gear position can be realized. In the R range, the manual valve outputs the line pressure as a R-range pressure, so as to supply the R-range pressure to both reverse clutch R/C and low-and-reverse brake band LR/B. As a result, the reverse clutch is engaged and at the same time the low-and-reverse brake band is applied. In this manner, the clutch- and band-application logic for the reverse gear position can be realized. In the P,N range, the manual valve acts to prevent the line pressure to be supplied to any hydraulic circuits. As a result of this, all of the friction elements are released and thus the automatic transmission is in neutral.

The previously-described ON/OFF control of line pressure solenoid 9 and duty-cycle control of each of low clutch solenoid 10, 2-4 brake band solenoid 11, high clutch solenoid 12, and low-and-reverse solenoid 13 are executed by means of a transmission controller 14. Transmission controller 14 generally comprises a microcomputer. The transmission controller includes an input/output interface (I/O), memories (RAM, ROM), and a microprocessor or a central processing unit (CPU). The input/output interface (I/O) of transmission controller 14 receives input information from various engine/vehicle switches and sensors, namely a throttle opening sensor 15, a turbine speed sensor 16, a transmission output speed sensor 17, and an inhibitor switch 18. Throttle opening sensor 15 is provided to detect a throttle opening TVO of engine 1. Turbine speed sensor 16 is provided to detect a turbine speed $N_t$ which is used as a transmission input speed (in other words, a torque converter output speed). Transmission output speed sensor 17 is provided to detect a transmission output speed $N_o$ (a rotational speed of transmission output shaft 5 of automatic transmission 2). Inhibitor switch 18 outputs a signal representative of the selected operating range. Within the transmission controller, the central processing unit (CPU) allows the access by the I/O interface of input informational data signals from the previously-discussed engine/vehicle switches and sensors 15, 16, 17 and 18. The CPU of transmission controller 14 is responsible for carrying an automatic shift control program stored in memories and is capable of performing necessary arithmetic and logic operations based on the input informational signal data TVO and $N_o$, so as to execute a basic automatic shift control processing according to a preprogrammed or predetermined shift pattern. Computational results (arithmetic calculation results), that is, calculated output signals (solenoid valve drive currents) are relayed via the output interface circuitry of transmission controller 14 to output stages, namely the previously-discussed solenoid valves 9 through 13. The basic automatic shift control processing is executed by the CPU of transmission controller 14, as follows. First, the processor of controller 14 retrieves or selects a desired gear position based on the two latest up-to-date informational data regarding the current engine/vehicle operating conditions, that is, the current value of throttle opening TVO and the current value of transmission output speed $N_o$ (regarded as vehicle speed), from the preprogrammed shift pattern. Secondly, a check is made to determine whether the current gear position that the transmission is actually controlled is identical to the desired gear position. Thirdly, if there is the discrepancy between the actual gear position and the desired gear position, controller 14 generates a transmission range gear shift command so as to perform a shift to the desired gear position. That is, according to the clutch- and band-application logic for the hydraulically-operated friction elements shown in FIG. 2, in order to achieve shifting to the desired gear position, switching between engagement (application) and disengagement (release) of each of the friction elements is achieved by properly adjusting the solenoid pressure from each of the solenoids 10 through 13 by way of the duty-cycle control. The basic automatic shift control processing is conventional and forms no part of the present invention. Note that in addition to the basic automatic shift control processing (or the normal automatic shift control processing), the shift control device of the embodiment can execute a drive-downshift forcible termination control which will be fully described hereunder in reference to the flow charts shown in FIGS. 3–5, and the time charts of FIGS. 6A–6D (showing Mode 1), 7A–7D (showing Mode 2), and 8A–8D (showing Mode 3). The drive-downshift forcible termination control of the embodiment is executed when a value of transmission input torque becomes reduced to below a torque value needed to satisfactorily advance a downshift during the drive downshift, that is, in the presence of a lack of transmission input torque.

Figure 3:
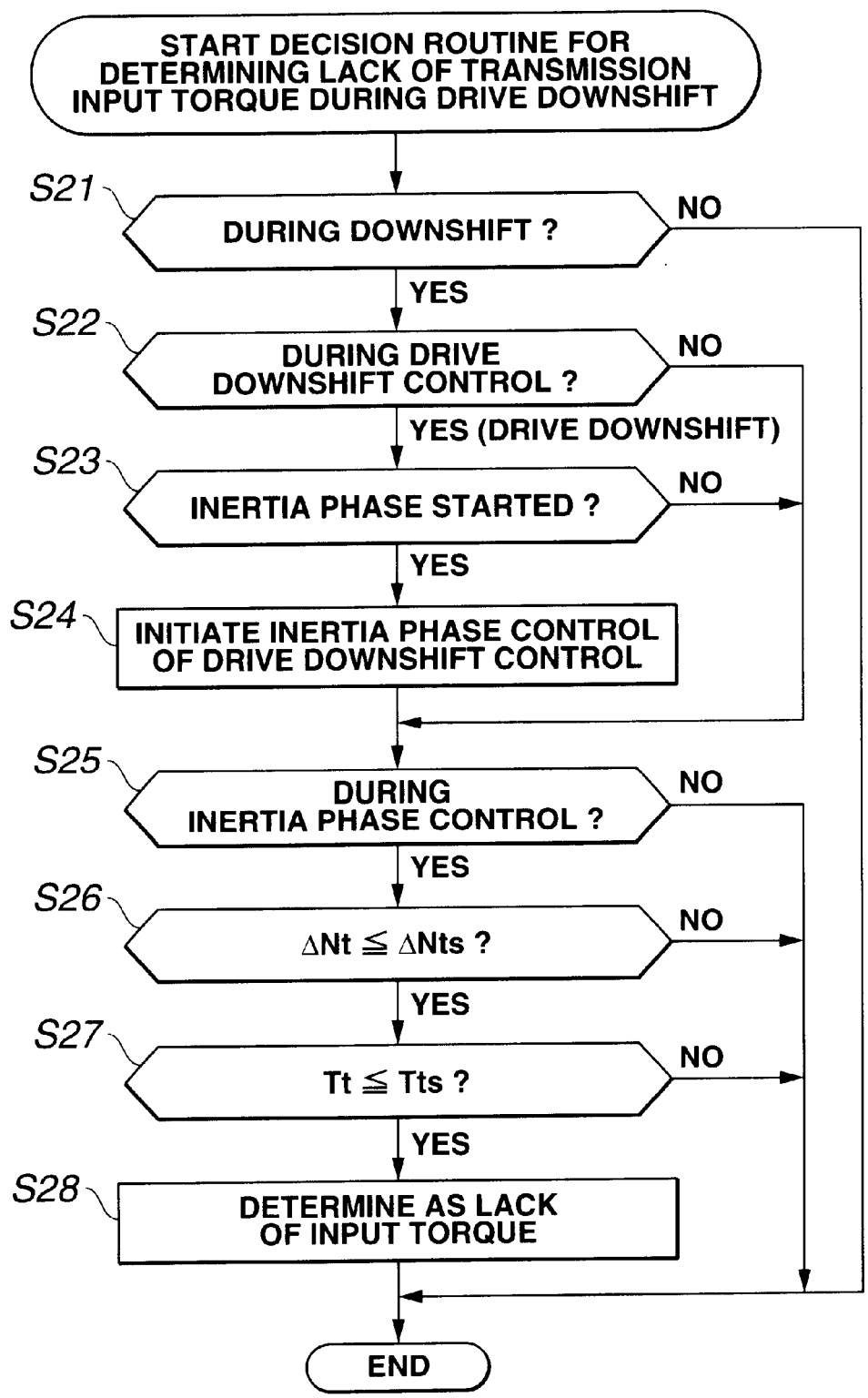
FIG. 3 is a flow chart showing a preprogrammed decision routine used to determine the presence or absence of the return of the accelerator pedal to the undepressed state and executed by the shift control device of the embodiment.

Referring now to FIG. 3, there is shown the decision routine used to determine whether the current transmission input torque value ($T_t$) is reduced to below a predetermined torque value ($T_{tS}$) needed to satisfactorily advance a downshift, owing to the return of the accelerator pedal from the depressed state to the undepressed state during the drive downshift. The routine shown in FIG. 3 is executed as time-triggered interrupt routines to be triggered every predetermined time intervals.

At step S21, a check is made to determine whether the transmission is in a downshift. When the answer to step S21 is in the negative (NO), that is, when the transmission is out of the downshift, the routine terminates. When the answer to step S21 is in the affirmative (YES), that is, during the downshift, step S22 occurs. At step S22, a test is made to determine whether a so-called drive downshift control, executed due to depression of the accelerator pedal or when the increase in engine speed is required, is executed. When the answer to step S22 is affirmative (YES), in other words, during the drive downshift control, the routine proceeds to step S23. At step S23, a check is made to determine whether an effective gear ratio i ($=N_t/N_o$) of the turbine speed (transmission input speed) $N_t$ to transmission output speed $N_o$ starts to change from a before-drive-downshift gear ratio to an after-drive-downshift-termination gear ratio and thus the inertia phase is started. When controller 14 determines that the inertia phase is started, step S24 occurs. At step S24, controller 14 initiates an inertia phase control of the drive downshift control. When the answer to step S24 is affirmative (YES), that is, during the inertia phase control of the drive downshift control, the routine flows from step S24 to step S25. When the answer to step S22 is negative, the routine jumps from step S22 to step S25, while skipping steps S23 and S24, since the drive-downshift forcible termination control of the shift control device of the embodiment is executed only during the drive downshift control. When the answer to step S23 is negative, the routine also flows to step S25. At step S25, a check is made to determine whether the transmission is in the inertia phase control mode of the drive downshift control. During the inertia phase control mode of the drive downshift control, step S26 occurs. At step S26, a check is made to determine whether the difference $\Delta N_t (=N_{t(n)}-N_{t(n-1)})$ between the current value $N_{t(n)}$ of turbine speed $N_t$ and the previous value $N_{t(n-1)}$ of turbine speed $N_t$, that is, a time rate of change in turbine speed $N_t$ is less than or equal to a predetermined or set positive small speed value $\Delta N_{tS}$. In case of $\Delta N_t \leq \Delta N_{tS}$, the routine flows to step S27. At step S27, a check is made to determine whether a transmission input torque $T_t$ is less than or equal to a predetermined or set torque value $T_{tS}$. When the two necessary conditions defined by the inequalities $\Delta N_t \leq \Delta N_{tS}$ and $T_t \leq T_{tS}$ are satisfied, the routine proceeds to step S28. At step S28, controller 14 determines that a state of the lack of transmission input torque $T_t$ occurs. Conversely when the answer to steps S25, S26, or S27 is negative, that is, when the transmission is out of the inertia phase control mode, in case of $\Delta N_t > \Delta N_{tS}$ or $T_t > T_{tS}$, the routine terminates. In order to timely execute the drive-downshift forcible termination control, the aforementioned predetermined speed value $\Delta N_{tS}$ is set to an upper limit of the time rate of change in transmission input speed (turbine speed $N_t$) that a shifting time period obtained when continuing the normal automatic shift control even in the presence of the lack of transmission input torque $T_t$ during the drive downshift control exceeds a predetermined threshold value (a predetermined long time period). In other words, predetermined speed value $\Delta N_{tS}$ is set to a threshold limit value of the time rate of change in transmission input speed (turbine speed $N_t$) above which a shifting time period obtained in absence of switching from the normal automatic shift control to the drive-downshift forcible termination control in the presence of the lack of transmission input torque $T_t$ during the drive downshift control exceeds a predetermined threshold value (i.e., a predetermined long time period). As is generally known, it is difficult to directly monitor or detect the transmission input torque $T_t$. Actually, the transmission input torque can be estimated based on the throttle opening TVO, an estimate of torque imparted to the turbine, or an amount of slippage of the torque converter. In other words, the throttle opening TVO, an estimate of torque imparted to the turbine, or an amount of slippage of the torque converter can be used as a value equivalent to or representative of the transmission input torque. The aforementioned predetermined torque value $T_{tS}$ is set to an upper limit value of a torque range within which it is impossible to rise transmission input speed $N_t$ up to a speed value above a speed needed to advance shifting (exactly, drive downshift) at a predetermined shifting speed. Assuming that the transmission input torque $T_t$ is estimated from or represented by the throttle opening TVO, as can be seen from the time charts shown in FIGS. 6A, 7A, and 8A, a predetermined or set value $TVO_S$ of the throttle opening corresponds to the predetermined torque value $T_{tS}$ of transmission input torque $T_t$. That is, when the throttle opening TVO is less than or equal to the set throttle opening $TVO_S$, controller 14 determines that the transmission input torque $T_t$ is less than or equal to the predetermined torque value $T_{tS}$.

Referring now to FIG. 4, there is shown the mode-selection routine used to select one of three operating modes (Mode 1, Mode 2, Mode 3) for the drive-downshift forcible termination control executed by the shift control device of the embodiment. The mode-selection routine of FIG. 4 is executed only when controller 14 determines that a state of the lack of transmission input torque $T_t$ occurs, according to the decision routine of FIG. 3.

At step S31, a check is made to determine whether through the previously-discussed step S28 of FIG. 3, the controller determines that a state of the lack of transmission input torque $T_t$ occurs. When the answer to step S31 is negative (NO), that is, in the absence of determination of the lack of transmission input torque $T_t$, the program returns from this mode-selection routine to the normal automatic shift control routine. Conversely when the answer to step S31 is affirmative (YES), that is, in case of the lack of transmission input torque $T_t$, step S32 occurs. At step S32, a check is made to determine whether the current drive downshift executed at the present moment is a one-way clutch shift caused by self-engagement of the one-way clutch (low one-way clutch L/OWC) while releasing the friction elements being in their engaged states. Concretely, in the automatic transmission shown in FIGS. 1 and 2, there are three different one-way clutch shifting processes. The first one-way clutch shift corresponds to a 2→1 downshift achieved by self-engagement of low one-way clutch L/OWC while releasing 2-4 brake band 2-4/B from its applied state. The second one-way clutch shift corresponds to a 3→1 downshift achieved by self-engagement of low one-way clutch L/OWC while disengaging high clutch H/C from its engaged state. The third one-way clutch shift corresponds to a 4→1 downshift achieved by self-engagement of low one-way clutch L/OWC while disengaging 2-4 brake band 2-4/B and high clutch H/C from their engaged states and simultaneously engaging low clutch L/C from its disengaged state. When the answer to step S32 is negative (NO), that is, when the current drive downshift is a non one-way clutch shift except 2→1 downshift, 3→1 downshift and 4→1 downshift, the routine proceeds from step S32 to step S33. At step S33, a check is made to determine whether the difference of the turbine speed $N_t$ before and after shifting is great and additionally the negative engine output torque (in other words, the negative transmission input torque) is great. That is, in the presence of negative engine torque fluctuations, a great negative torque tends to act on the transmission output shaft by forcibly rising the rotational speed of the engine producing the negative torque. This causes an uncomfortably great vehicle deceleration rate (or an uncomfortably great engine braking effect). In such a case that the uncomfortably great vehicle deceleration occurs due to both the great difference of turbine speed $N_t$ before and after shifting and the great negative torque, the routine flows from step S33 to step S34. At step S34, a check is made to determine whether the next shifting process executed with the lack of transmission input torque $T_t$ after termination of the drive downshift (e.g., 4→2 downshift) is an upshift (e.g., 2→4 upshift) through which the transmission is returned to the gear position (e.g., 4th-speed gear position) established before the drive downshift. When either the answer to step S33 or the answer to step S34 is negative (NO), the routine proceeds to step S35. At step S35, the first operating mode (Mode 1) is selected so as to terminate the inertia phase control of the drive downshift control when controller 14 determines that the lack of transmission input torque $T_t$ takes place during the drive downshift (corresponding to the non one-way clutch shifting). Conversely when the answer to step S33 and the answer to step S34 are both affirmative (YES), step S36 occurs. At step S36, the second operating mode (Mode 2) is selected so as to forcibly and immediately terminate the drive downshift control when controller 14 determines that the lack of transmission input torque $T_t$ takes place during the drive downshift (corresponding to the non one-way clutch shifting). Returning to step S32, when the current drive downshift is a one-way clutch shift (either 2→1 downshift, 3→1 downshift or 4→1 downshift), the routine proceeds from step S32 to step S37. At step S37, the third operating mode (Mode 3) is selected so as to forcibly timely terminate the drive downshift control when controller 14 determines that the lack of transmission input torque $T_t$ takes place during the drive downshift (corresponding to the one-way clutch shifting). After steps S35, S36 or S37, step S38 occurs. At step S38, one cycle of the mode-selection routine terminates.

Referring now to FIG. 5, there is shown the selected operating mode execution routine.

In the same manner as step S31 of FIG. 4, at step S41, a check is made to determine whether through the previously-discussed step S28 of FIG. 3, the controller determines that a state of the lack of transmission input torque $T_t$ occurs. When the answer to step S41 is negative, that is, in the absence of determination of the lack of transmission input torque $T_t$, the program returns from this selected operating mode execution routine to the normal automatic shift control routine. When the answer to step S41 is affirmative, that is, in case of the lack of transmission input torque $T_t$, the routine proceeds from step S41 to step S42. At step S42, a check is made to determine whether the selected operating mode is the first operating mode (Mode 1). When the answer to step S42 is affirmative, that is, when Mode 1 (suitable to non one-way shifting) is selected, the routine flows from step S42 through steps S45 and S46 to step S47. At step S45, the drive-downshift forcible termination control based on the first operating mode (Mode 1) is initiated (see the time charts shown in FIGS. 6A–6D). The drive-downshift forcible termination control based on the first operating mode (Mode 1) is hereunder described in detail in reference to the time charts of FIGS. 6A–6D.

As can be seen from the time charts shown in FIGS. 6A–6D, in particular, as appreciated from a change in a command value (Pc) of working-fluid pressure on the applied side and a change in a command value (Po) working-fluid pressure on-the released side (See FIG. 6D) at a time $t_1$ when the throttle opening TVO is risen or increased (see the leading edge at $t_1$ in FIG. 6A) due to depression of the accelerator pedal, a drive downshift occurs according to the normal time series control (the normal shift control processing). The drive-downshift forcible termination control based on the first operating mode (Mode 1) is initiated at $t_2$ when the controller determines the presence of the return of the accelerator pedal from the depressed state to the undepressed state by the necessary condition defined by $TVO \leq TVO_S$ (that is. $T_t \leq T_{tS}$) and additionally the time rate of change $\Delta N_t$ in turbine speed $N_t$ becomes below the predetermined speed value $\Delta N_{tS}$ (see a drop in the time rate of change $\Delta N_t$ in turbine speed $N_t$ at $t_2$ as indicated by the solid line in FIG. 6C), in other words, the necessary condition defined by $\Delta N_t \leq \Delta N_{tS}$ at step S26 is satisfied. In FIGS. 6B–6D, the broken lines indicate changes in the transmission output torque, turbine speed $N_t$, working-fluid pressure command value Pc on the applied side, and working-fluid pressure command value Po on the released side, obtained by the normal time series control (the normal shift control processing) when there is no drop in throttle opening TVO after $t_2$ without returning the accelerator pedal to the undepressed state (see the constant throttle opening indicated by the broken line in FIG. 6A). As can be appreciated from these changes indicated by the broken lines in FIGS. 6A–6D, the drive downshift based on the normal time series control is continuously executed after $t_2$. On the other hand, according to the drive-downshift forcible termination control based on the first operating mode (Mode 1), as indicated by the solid line in FIG. 6D, after $t_2$ the working-fluid pressure command value Pc on the applied side is increased at a predetermined gradient (or a predetermined rate of change) $\alpha$, while the working-fluid pressure command value Po on the released side is decreased at a predetermined gradient (or a predetermined rate of change) $\beta$ (see step S45 of FIG. 5). At this time, the volumetric capacity of working fluid applied to the friction elements of the applied side increases, thus advancing or promoting the downshift. As a result of this, turbine speed $N_t$ is pulled up and at the same time the rotational speed of the engine, producing the negative torque, is also pulled up forcibly, and whereby the transmission output torque (transmission output shaft torque) becomes negative (see the changes in transmission output torque and turbine speed $N_t$ between $t_2$ and $t_3$ in FIGS. 6B and 6C). In the first operating mode (Mode 1), the previously-discussed working-fluid pressure control for both the applied side and the released side is continued until a time $t_3$ at which the effective gear ratio i ($=N_t/N_o$) of transmission input speed (turbine speed) $N_t$ to transmission output speed $N_o$ reaches an after-drive-downshift-termination gear ratio and the controller determines that the transmission input speed rises up to a synchronous speed, in other words, step S46 of FIG. 5 determines that the inertia phase has been terminated. At $t_3$, the inertia phase control of the drive downshift control is terminated (see step S47 of FIG. 5). After termination of the inertia phase control (after $t_3$), as can be appreciated from a rise in working-fluid pressure command value Pc of the applied side between $t_3$ and $t_4$, command value Pc is risen up to the maximum pressure level (corresponding to the line pressure used as an initial pressure). For a predetermined period of time between $t_4$ and $t_5$, the next shifting process is prevented or inhibited. Only after $t_5$, the controller allows an upshift to arise from the return of the accelerator pedal to the undepressed state. As a matter of course, the time rate of change $\alpha$ of working-fluid pressure command value Pc of the applied side and the time rate of change $\beta$ of working-fluid pressure command value Po of the released side are predetermined or preset so that a shifting time period of the drive downshift never exceeds the predetermined threshold value (the predetermined long time period). In particular, in the shift control device of the embodiment, these rate-of-changes $\alpha$ and $\beta$ are determined depending upon both a quantity of state related to transmission input torque $T_t$ and a quantity of state related to the difference in transmission input speeds before and after shifting, in other words, an inertia to be absorbed during shifting, so as to provide a desired shift feeling just like a shift feeling similar to downshift obtained by manual shifting.

Returning now to step S42 of FIG. 5, when the answer to step S42 is negative, step S43 occurs. At step S43, a check is made to determine whether the selected operating mode is the third operating mode (Mode 3). When the answer to step S43 is negative, the routine proceeds from step S43 to step S44. At step S44, a check is made to determine whether the selected operating mode is the second operating mode (Mode 2). When the answer to step S44 is affirmative, that is, when Mode 2 (suitable to non one-way clutch shifting) is selected, the routine flows from step S44 to step S48. At step S48, the drive-downshift forcible termination control based on the second operating mode (Mode 2) is initiated (see the time charts shown in FIGS. 7A–7D). The drive-downshift forcible termination control based on the second operating mode (Mode 2) is hereunder described in detail in reference to the time charts of FIGS. 7A–7D.

FIG. 7A shows the same accelerator-pedal operation (or the same throttle-opening change) as FIG. 6A. That is, at the time point $t_1$ the accelerator pedal is depressed and thus the throttle opening TVO is risen, and thereafter at the time point $t_2$ the accelerator pedal is returned to its undepressed state and thus the throttle opening TVO is fallen. As can be appreciated from the time charts shown in FIGS. 7A–7D, in particular, as appreciated from a change in a command value (Pc) of working-fluid pressure on the applied side and a change in a command value (Po) working-fluid pressure on the released side (See FIG. 7D) at $t_1$, a drive downshift occurs according to the normal time series control (the normal shift control processing) from the time point $t_1$. During the drive downshift after $t_1$, when the controller determines the presence of the return of the accelerator pedal to the undepressed state by the condition defined by TVO≦TVO$_S$ (that is. $T_t \leq T_{tS}$) at $t_2$, the drive-downshift forcible termination control based on the second operating mode (Mode 2) is initiated. As can be appreciated from a rapid rise in working-fluid pressure command value Pc on the applied side and a rapid drop in working-fluid pressure command value Po on the released side, indicated by the solid line in FIG. 7D, at $t_2$ the working-fluid pressure command value Pc on the applied side is immediately risen up to the same maximum pressure level as the line pressure, while the working-fluid pressure command value Po on the released side is immediately decreased down to zero (a predetermined minimum pressure level) (see step S48 of FIG. 5). In this manner, the drive downshift control immediately ends. In the second operating mode (Mode 2), as appreciated from the changes in working-fluid pressure command values Pc and Po in FIG. 7D, note that the drive downshift control is forcibly immediately terminated and just after $t_2$ the next upshift starts at once, even when the inertia phase is not yet terminated. From the middle of inertia phase, the next upshift starts. That is, the shifting process can be smoothly rapidly transferred from the drive downshift to the next upshift, without terminating the inertia phase of the drive downshift control, in other words, without forcibly rising the rotational speed of the engine, producing the negative torque. This ensures a rapid upshift. The rapid upshift, obtained by virtue of the second operating mode (Mode 2), effectively prevents the occurrence of great pull-in torque shocks which may occur owing a great negative torque acting on the transmission output shaft by forcibly rising the rotational speed of the engine, producing the negative torque (see the waveform of the transmission output torque indicated by the solid line in FIG. 7B and varying at a slight negative torque value). As can be seen from step S34 of FIG. 4, the execution of the drive-downshift forcible termination control based on the second operating mode (Mode 2) is limited to a particular case that the next upshifting process executed with the lack of transmission input torque $T_t$ after termination of the drive downshift (e.g., 4→2 downshift) is an upshift (e.g., 2→4 upshift) through which the transmission is returned to the gear position (e.g., 4th-speed gear position) established before the drive downshift. Therefore, in executing the next upshifting process, it is possible to attain the next shift only by engaging (applying) and disengaging (releasing) the same friction elements. Thus, the second operating mode (Mode 2) contributes to a smooth transition from the drive downshift to the next upshift.

Returning to step S43 of FIG. 5, when the answer to step S43 is affirmative, that is, Mode 3 (suitable to one-way clutch shifting) is selected, the routine proceeds from step S43 via steps S49 and S50 to step S51. At step S49, the drive-downshift forcible termination control based on the third operating mode (Mode 3) is initiated (see the time charts shown in FIGS. 8A–8D). The drive-downshift forcible termination control based on the third operating mode (Mode 3) is hereunder described in detail in reference to the time charts of FIGS. 8A–8D.

FIG. 8A shows the same accelerator-pedal operation (or the same throttle-opening change) as FIGS. 6A and 7A. At $t_1$, the accelerator pedal is depressed and thus the throttle opening TVO is risen, and thereafter at $t_2$ the accelerator pedal is returned to its undepressed state and thus the throttle opening is fallen. As can be appreciated from the time charts shown in FIGS. 8A–8D, in particular, as appreciated from a change in a command value (Po) of working-fluid pressure on the released side (See FIG. 8D) at $t_1$, a drive downshift occurs according to the normal time series control from the time point $t_1$. During the drive downshift after $t_1$, when the controller determines the presence of the return of the accelerator pedal to the undepressed state by the condition defined by TVO≦TVO$_S$ (that is. $T_t \leq T_{tS}$) at $t_2$, the drive-downshift forcible termination control based on the third operating mode (Mode 3) is initiated. According to the drive-downshift forcible termination control based on the third operating mode (Mode 3), as indicated by the solid line in FIG. 8D, after $t_2$ only the working-fluid pressure command value Po on the released side is decreased at a predetermined gradient (or a predetermined rate of change) γ (see step S49 of FIG. 5), because of the one-way clutch shifting in which a friction element to be applied does not exist. As discussed above, according to the third operating mode (Mode 3), the drive-downshift forcible termination control can be applied to the one-way clutch shifting that a friction element to be applied does not exist. After $t_2$, during the drive-downshift forcible termination control based on the third operating mode, the transmission output torque and turbine speed $N_t$ vary like the respective characteristic curves indicated by the solid lines in FIGS. 8B and 8C. The previously-noted time rate of change γ of working-fluid pressure command value Po of the released side is preset to a maximum gradient above which undershoot of working-fluid pressure on the released side subjected to pressure-reduction control takes place. In other words, the predetermined time rate of change γ is preset to a maximum time rate of change of a range within which there is no undershoot of working-fluid pressure on the released side during the pressure-reduction control). By way of proper setting of the time rate of change γ of working-fluid pressure command value Po to the predetermined maximum gradient that undershoot of working-fluid pressure on the released side does not occur, according to the drive-downshift forcible termination control based on the third operating mode (Mode) it is possible to terminate the drive downshift control performed by the one-way clutch shifting for as short a time interval as possible without hindrance to drive downshift control itself. As can be seen from step S50 of FIG. 5, the drive-downshift forcible termination control based on the third operating mode is executed continuously, until a pressure drop of working-fluid pressure command value Po of the released side reaches a zero pressure level. At step S50, as soon as the controller determines that a necessary condition defined by Po≦0 is satisfied (see the time point $t_6$ of FIG. 8D), the routine flows from step S50 to step S51. At step S51 or at $t_6$, the drive downshift control terminates. As can be appreciated from a period of time between $t_6$ and $t_7$, a next shifting process, which may occur owing to the return of the accelerator pedal to the undepressed state can be prevented or inhibited for a predetermined brief moment $(t_7-t_6)$. When the predetermined time period $(t_7-t_6)$ between $t_6$ and $t_7$ has expired, the next shifting process is started, so as to prevent the drive-downshift forcible termination control from exerting a bad influence upon the next shifting process executed subsequently to the drive downshift. Returning to steps S46 or S50, when the answer to step S46 is negative, or when the answer to step S50 is negative, the program returns from the selected operating mode execution routine to the normal automatic shift control routine.

As will be appreciated from the above, according to the shift control device of the embodiment, in determining the presence or absence of a lack of transmission input torque during drive downshift, that is, in determining whether there is a reduction in the rate of change in transmission input speed, arising from a drop in the transmission input torque, prior to execution of the drive-downshift forcible termination control, the previously-described two necessary conditions defined by $\Delta N_t \leq \Delta N_{tS}$ and $T_t \leq T_{tS}$ (i.e., TVO $\leq$ TVO$_S$) are used. Thus, there is no risk erroneously determining a state defined by $\Delta N_t \leq \Delta N_{tS}$ but $T_t > T_{tS}$ as the presence of the lack of transmission input torque. This eliminates wasteful executions of the drive-downshift forcible termination control, thus preventing undesired shift shocks, and avoiding the previously-described first problem. As a necessary condition used to determine that the rate of change in transmission input speed reduces owing to the lack of transmission input torque, a comparison result representing whether the time rate of change $\Delta N_t$ in transmission input speed is less than or equal to the predetermined positive small speed value $\Delta N_{tS}$ is used. Therefore, even in the presence of a drop in transmission input torque such that the transmission input speed continues to rise slightly, it is possible to detect a reduction in the time rate of change in transmission input speed arising from the lack of transmission input torque. At this time, switching from the normal time series control (the normal shift control processing) to the drive-downshift forcible termination control is made. This prevents an undesired long downshifting time duration, thus avoiding the previously-described second problem. Additionally, in the shift control device of the embodiment, the predetermined small speed value $\Delta N_{tS}$ is set to an upper limit of the time rate of change in transmission input speed (turbine speed $N_t$) that a shifting time period obtained when continuing the normal automatic shift control (the normal time series control) even in the presence of the lack of transmission input torque $T_t$ during the drive downshift control exceeds a predetermined threshold value (a predetermined long time period). By proper setting of the predetermined small speed value $\Delta N_{tS}$ to the upper limit of the time rate of change in transmission input speed, the shift control device of the embodiment can accurately determine whether or not the second problem occurs. When there is a less possibility that the second problem occurs, the transmission controller acts to continue the normal automatic shift control. Only when there is a possibility that the second problem occurs, the transmission controller initiates the drive-downshift forcible termination control. Furthermore, in the shift control device of the embodiment, the predetermined torque threshold value $T_{tS}$ is set to an upper limit value of a torque range within which it is impossible to rise transmission input speed $N_t$ up to a speed value above a speed needed to advance shifting (exactly, drive downshift) at a predetermined shifting speed. This more reliably avoids the previously-described first problem.

In the shown embodiment, the lack of transmission input torque takes place when the accelerator pedal is shifted from the depressed state to undepressed state by the driver during drive downshift control. Note that the state of the lack of transmission input torque also occurs during downshift based on manual shifting with the accelerator pedal depressed. In such a case, the drive-downshift forcible termination control executed by the shift control device of the present invention can be applied in the same manner as described above. In the shown embodiment, as appreciated from a group of solenoid valves (9, 10, 11, 12, 13) mounted in control valve body 8 shown in FIG. 1, automatic transmission 2 is exemplified in a direct-operated solenoid valve type automatic transmission that working-fluid pressures applied to the respective friction elements can be individually controlled. Alternatively, the shift control device of the invention can be applied to a shift-valve type automatic transmission that working-fluid pressures applied to the respective friction elements cannot be individually controlled.

The entire contents of Japanese Patent Application No. P2000-282323 (filed Sep. 18, 2000) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A shift control device for an automatic transmission capable of automatically shifting to a desired gear position by selectively engaging a plurality of friction elements via working-fluid pressure, and of switching to a drive-downshift forcible termination control when a time rate of change in transmission input speed is reduced to below a threshold value owing to a drop in transmission input torque during drive downshift from a higher gear position to a lower gear position with an accelerator pedal depressed, said shift control device comprising:

a drive-downshift forcible termination control section that executes the drive-downshift forcible termination control only when the time rate of change in transmission input speed is reduced to below a first predetermined threshold value and a value equivalent to the transmission input torque is reduced to below a second predetermined threshold value, to forcibly terminate the drive downshift.

2. The shift control device as claimed in claim 1, wherein the first predetermined threshold value ($\Delta N_{tS}$) for the time rate of change ($\Delta N_t$) in transmission input speed ($N_t$) is set to an upper limit above which a shifting time period obtained in absence of switching to the drive-downshift forcible termination control exceeds a predetermined time period.

3. The shift control device as claimed in claim 1, wherein the second predetermined threshold value ($T_{tS}$) for the value equivalent to the transmission input torque is set to an upper limit value of a torque range within which it is impossible to rise the transmission input speed ($N_t$) up to a speed value above a speed needed to advance the drive downshift at a predetermined shifting speed.

4. The shift control device as claimed in claim 1, wherein when the drive downshift is a one-way clutch shift caused by self-engagement of a one-way clutch while releasing a friction element being in its engaged state, the drive-downshift forcible termination control is performed by decreasing a working-fluid pressure of the friction element at a predetermined time rate of change ($\gamma$).

5. The shift control device as claimed in claim 4, wherein the predetermined time rate of change ($\gamma$) is preset to a maximum rate of change of a range within which there is no undershoot of the working-fluid pressure of the friction element.

6. The shift control device as claimed in claim 4, wherein a determination of termination of a drive downshift control is made at a time ($t_4$) when the working-fluid pressure is reduced to below a predetermined pressure level, and a next shifting process is inhibited for a period of time ($t_5$–$t_4$) from the time ($t_4$).

7. The shift control device as claimed in claim 1, wherein when the drive downshift is a non one-way clutch shift without self-engagement of a one-way clutch, the drive-downshift forcible termination control is performed by increasing a working-fluid pressure of a first friction element to be applied at a predetermined time rate of change ($\alpha$) and by decreasing a working-fluid pressure of a second friction element to be released at a predetermined time rate of change ($\beta$).

8. The shift control device as claimed in claim 7, wherein each of the predetermined time rate of change ($\alpha$) for the first friction element to be applied and the predetermined time rate of change ($\beta$) for the second friction element to be released is preset so that a shifting time period does not exceed a predetermined time period.

9. The shift control device as claimed in claim 8, wherein the predetermined time rate of change ($\alpha$) for the first friction element to be applied and the predetermined time rate of change ($\beta$) for the second friction element to be released are determined depending upon both a quantity of state related to the transmission input torque ($T_t$) and a quantity of state related to a difference in transmission input speeds before and after shifting, so as to provide a desired shift feeling.

10. The shift control device as claimed in claim 7, wherein when a first condition that the drive downshift is the non one-way clutch shift, a second condition that there is a possibility of pull-in torque shocks during an execution cycle of the drive-downshift forcible termination control, and a third condition that a next shifting process executed after termination of a drive downshift control is an upshift that returns to a gear position established before the drive downshift are all satisfied, the drive-downshift forcible termination control is performed by immediately increasing the working-fluid pressure of the first friction element to be applied up to a predetermined maximum pressure level and by immediately decreasing the working-fluid pressure of the second friction element to be released down to a predetermined minimum pressure level, so as to be able to immediately start the next shifting process.

11. A shift control device for an automatic transmission capable of automatically shifting to a desired gear position by selectively engaging a plurality of friction elements via working-fluid pressure, and of switching to a drive-downshift forcible termination control when a time rate of change in transmission input speed is reduced to below a threshold value owing to a drop in transmission input torque during drive downshift from a higher gear position to a lower gear position with an accelerator pedal depressed, said shift control device comprising:

(a) a drive-downshift control determining section that determines whether the transmission is in a drive downshift control;

(b) an inertia phase control determining section that determines whether the transmission is in an inertia phase control according to which a transmission input speed is rising to an after-shifting synchronous speed;

(c) an arithmetic-calculation section that calculates a time rate of change ($\Delta N_t$) in transmission input speed ($N_t$);

(d) a first comparison section that compares the time rate of change ($\Delta N_t$) in transmission input speed to a first predetermined threshold value ($\Delta N_{tS}$);

(e) an estimation section that estimates a value equivalent to the transmission input torque ($T_t$);

(f) a second comparison section that compares the value equivalent to the transmission input torque ($T_t$) to a second predetermined threshold value ($T_{tS}$); and (g) a drive-downshift forcible termination control section that executes the drive-downshift forcible termination control only when the time rate of change ($\Delta N_t$) in transmission input speed is reduced to below the first predetermined threshold value ($\Delta N_{tS}$) and the value equivalent to the transmission input torque ($T_t$) is reduced to below the second predetermined threshold value ($T_{tS}$), to forcibly terminate the drive downshift.

12. The shift control device as claimed in claim 11, further comprising:

(h) a first determining section that determines whether the drive downshift is a one-way clutch shift caused by self-engagement of a one-way clutch while releasing a friction element being in its engaged state or a non one-way clutch shift;

(i) a second determining section that determines whether there is a possibility of a great vehicle deceleration rate occurring owing to a big difference in transmission input speeds before and after shifting and a great negative engine output torque;

(j) a third determining section that determines whether a next shifting process executed after termination of the drive downshift control is an upshift that returns to a gear position established before the drive downshift; and (k) a mode-selection section that selects a first operating mode that forcibly terminates the inertia phase control with a first predetermined time delay when the drive downshift is the non one-way clutch shift without self-engagement of a one-way clutch and there is a less possibility of the great vehicle deceleration rate, and selects a second operating mode that immediately forcibly terminates the drive downshift control and immediately start the next shifting process when the drive downshift is the non one-way clutch shift and there is a possibility of the great vehicle deceleration rate and the next shifting process executed after termination of the drive downshift control is the upshift that returns to the gear position established before the drive downshift, and selects a third operating mode that forcibly terminates the drive downshift control with a second predetermined time delay when the drive downshift is the one-way clutch shift with self-engagement of the one-way clutch.

13. The shift control device as claimed in claim 12, wherein at the first operating mode a working-fluid pressure of a first friction element to be applied is increased at a predetermined time rate of change ($\alpha$) and a working-fluid pressure of a second friction element to be released is decreased at a predetermined time rate of change ($\beta$), and at the second operating mode the working-fluid pressure of the first friction element is immediately increased up to a predetermined maximum pressure level and the working-fluid pressure of the second friction element is immediately decreased down to a predetermined minimum pressure level, and at the third operating mode only the working-fluid pressure of the second friction element is decreased at a predetermined time rate of change ($\gamma$), and wherein the first predetermined time delay is determined based on the predetermined time rate of change ($\alpha$) for the first friction element to be applied and the predetermined time rate of change ($\beta$) for the second friction element to be released, and the second predetermined time delay is determined based on the predetermined time rate of change ($\gamma$) for the second friction element to be released.

14. The shift control device as claimed in claim 13, wherein each of the predetermined time rate of change ($\alpha$) for the first friction element to be applied and the predetermined time rate of change ($\beta$) for the second friction element to be released is preset so that a shifting time period does not exceed a predetermined time period.

15. The shift control device as claimed in claim 14, wherein the predetermined time rate of change ($\alpha$) for the first friction element to be applied and the predetermined time rate of change ($\beta$) for the second friction element to be released are determined depending upon both a quantity of state related to the transmission input torque ($T_t$) and a quantity of state related to a difference in transmission input speeds before and after shifting, so as to provide a desired shift feeling.

16. The shift control device as claimed in claim 15, wherein the predetermined time rate of change ($\gamma$) is preset to a maximum rate of change of a range within which there is no undershoot of the working-fluid pressure of the second friction element.

17. The shift control device as claimed in claim 16, wherein a determination of termination of the drive downshift control is made at a time ($t_4$; $t_6$) when the working-fluid pressure of the second friction element is reduced to below a predetermined pressure level, and a next shifting process is inhibited for a period of time ($t_5-t_4$; $t_7-t_6$) from the time ($t_4$; $t_6$).

* * * * *